Patented Mar. 20, 1945

2,372,090

UNITED STATES PATENT OFFICE 2,372,090

PRODUCTION OF HIGHER MOLECULAR WEIGHT DICARBOXYLIC ACIDS

Edward C. Kirkpatrick, Wilmington, Del., assignor to E. I. du Pont de Nemours & Company, Wilmington, Del., a corporation of Delaware No Drawing. Application January 28, 1942, Serial No. 428,502

7 Claims. (Cl. 260—537)

This invention relates to a method for carboxylating olefinic compounds and particularly to a method for preparing dicarboxylic acids by carboxylating an olefinic or hydroxy monocarboxylic acid.

Aliphatic polycarboxylic acids are widely used in the preparation of condensation polymers such as polyamides, polyesters, alkyd resins and the like. The methods available for the preparation of polycarboxylic acids are not entirely satisfactory because they are generally obtained by degrading larger molecules. This, of course, operates to increase costs because of material losses in the synthesis and generally poor yields inherent in the reactions in question. In the case of a number of dicarboxylic acids, such as malonic and glutaric acids, succinic acid and dicarboxylic acids having an even number of carbon atoms special synthesis methods have to be employed. Dicarboxylic acids in which one of the carboxyls is attached to a secondary carbon atom are virtually unobtainable in commercial quantities. Of the longer chain homologs of these acids, only alpha-octylsebacic acid is known, being obtained in low yield from dihydroxystearic acid by a series of complex reactions involving oxidation and benzilic acid rearrangement. Such long chain alkyl substituted dibasic acids have inherently high organic solvent solubility and moisture resistance and are therefore highly desirable as intermediates in the synthesis of polymers and resins.

It is an object of this invention to develop a generally practical, economical method for the preparation of certain dibasic acids. Other objects will be apparent from the following description of the invention.

These objects are accomplished by the following process which comprises reacting an olefinic or hydroxy carboxylic acid, in which the olefinic linkage or hydroxyl group is separated from the carboxyl carbon by a chain of at least two contiguous atoms, with carbon monoxide and water in the presence of a catalyst at elevated temperatures and pressures.

In a preferred embodiment of the invention an olefinic or hydroxy monocarboxylic acid, in which the olefinic linkage or hydroxyl group is separated from the carboxyl carbon by a chain of at least two contiguous atoms, is caused to react with carbon monoxide and water by heating in a closed reaction vessel for 1 to 4 hours at temperatures of 100° to 250° C. and at pressures of 400 to 1000 atmospheres in the presence of a boron fluoride catalyst. The crude reaction mixture is dissolved in benzene, washed with water until neutral to litmus, dried, and the solvent removed by evaporation. The crude dibasic acid obtained is then converted to the methyl ester and is purified by fractional distillation. The ester may be saponified to give the pure dibasic acid.

The exact manner of practicing this invention will vary depending upon the particular compounds processed and catalysts used; however, the following will illustrate its application.

*Example I*

A charge of oleic acid (C. P.), boron trifluoride and water in the mole ratio of 3:1.03:2.6 is mixed at 0° C. and drawn into an evacuated silver-lined reaction vessel. The reaction mixture is pressured with carbon monoxide to 400 atmospheres and the temperature raised during 38 minutes to 150° C. Pressure is increased to 800 atmospheres with additional carbon monoxide. During 2 hours the temperature is held at 150° to 159° C. during which time a pressure drop of 90 atmospheres is noted. The reaction mixture is then cooled to room temperature and discharged from the reaction vessel. The reddish brown viscous oil is dissolved in low boiling petroleum ether, washed with water to remove boron trifluoride, and dried over sodium sulfate. The petroleum ether solvent is removed by concentration at reduced pressure and the residual dark viscous oil subjected to analysis. The analytical results are as follows: Calculated for oleic acid: Iodine number, 90.2; hydroxyl number, 0; acid number, 199; saponification number, 199. Calculated for carboxystearic acid: Iodine number, 0; hydroxyl number, 0; acid number, 342; saponification number, 342. Found: Iodine number, 10.3; hydroxyl number, 25.6; acid number, 242.6; saponification number, 241.6. Calculations based on the decrease in iodine number and the increase in acid and saponification numbers of the reaction mixture over starting material indicate a conversion of oleic to dibasic acid of approximately 30%.

*Example II*

A charge consisting of oleic acid (C. P.), water and boron trifluoride in the mole ratio of 3:1.2:3 is mixed at 0° C. and drawn into a silver-lined reaction vessel. The reaction mixture is heated to 148° C. during 80 minutes under an initial carbon monoxide pressure of 700 to 800 atmospheres. During an additional 110 minutes the temperature is raised to 193° C. with an accompanying pressure drop of 335 atmospheres. The reaction mixture is dissolved in benzene, washed with water until neutral to litmus, dried over sodium sulfate and concentrated to a viscous oil. Analysis of the product gives the following results. Calculated for oleic acid: Iodine number, 90.2; hydroxyl number, 0; acid number, 199; saponification number, 199. Calculated for carboxystearic acid: Iodine number, 0; hydroxyl number, 0; acid number, 342; saponification number, 342. Found: Iodine number, 22.9; hydroxyl number, 24.2; acid number 228.2; saponification number, 238.5. The increase in saponification number is about 29% of that to be expected as a result of dibasic acid formation in theoretical yield. The iodine number indicates saturation of about 73% of the original olefinic content, part of which is probably due to hydroxylation at the double bond.

A mixture of 128 parts of the reaction product, 160 parts of methanol, and 19 parts of sulfuric acid is refluxed for 5 hours. Dilution with water results in separation of an oily layer which is extracted with benzene, washed with dilute sodium bicarbonate solution, then with water, and dried over sodium sulfate. After removal of the benzene solvent the residual oil is distilled under reduced pressure. Fractionation gives a straw-yellow oil boiling at 220° to 230° C. (2.3 mm.) and having a saponification number of 299.5 (theory for dimethyl ester of carboxystearic acid, 315). This ester has a specific gravity 25° C./4° C. of 0.956, a refractive index $N_{25}$ of 1.4602, and analyzes C–70% and H–10.8%. The calculated values for $C_{21}H_{40}O_4$ are C–70.7 and H–11.2%.

Ten parts of the methyl ester is refluxed for 18 hours in a mixture of 25 parts of ethyl alcohol and 30 parts of water containing 3 parts of sodium hydroxide. The straw-colored solution is made slightly acid to litmus and the resulting oily upper layer is separated, dissolved in benzene, washed with water until neutral to litmus, and dried over sodium sulfate. Concentration under reduced pressure gives a pale amber, very viscous oil. A small portion is converted to a calcium salt, which analyzes 9.31% calcium (dibasic acid theory, 10.93).

The bifunctionality of this dibasic acid is demonstrated by preparation of spinnable polyamides by heating chemically equivalent portions thereof and decamethylenediamine and also hexamethylenediamine. A spinnable polyamide is also obtained by preparing a 50:50 interpolymer of the dibasic acid and hexamethylenediamine with hexamethylenediammonium adipate.

*Example III*

A charge consisting of methyl 12-hydroxystearate, water, and boron trifluoride in the mole ratio of 3:1:1.15 is mixed at 0° C. and drawn into a silver-lined reaction vessel. The reaction mixture is heated to 155° C. during 68 minutes under an initial carbon monoxide pressure of 700 to 800 atmospheres. During an additional 37 minutes the temperature is raised to 182° C., with an accompanying pressure drop of 50 atmospheres. The reaction mixture is washed with water, dried over sodium sulfate, and filtered. Analysis of the product gives the following results. Calculated for methyl 12-hydroxystearate: Iodine number, 0; hydroxyl number, 179; acid number, 0; saponification number, 179. Calculated for monomethyl ester of carboxystearic acid: Iodine number, 0; hydroxyl number, 0; acid number, 164; saponification number, 328. Found: Iodine number, 67.9; hydroxyl number, 87.1; acid number 60.8; saponification number, 193.8. The decrease in hydroxyl number and the increase in acid and saponification numbers indicate formation of dibasic acid. Dehydration at the hydroxyl group is indicated by the increase in iodine number.

Olefinic acids of the type defined above are suitable for the practice of this invention. Thus, there can be used undecylenic, erucic, elaidic, petroselinic, brassidic, isoerucic, ricinoleic, linoleic, abietic, eleostearic, and similar acids to obtain the corresponding polycarboxy compounds. Such acids, containing at least 8 carbon atoms, may also be used conveniently in the form of their esters, anhydrides, or salts. Compounds which are functionally capable of dehydration or rearrangement to give the desired olefinic acids are also suitable. Among such may be mentioned hydroxy acids such as those obtainable by hydrolysis of hydrogenated castor oil (presumably 12-hydroxystearic acid) or hydrogenated oiticica oil (presumably 4-hydroxystearic acid), 10-hydroxystearic acid, 9,10-dihydroxystearic acid, etc. and lactones such as stearolactone, etc.

In the practice of this invention boron halogen compounds are operative as catalysts. In place of the boron halogen compounds there can be used halogen compounds of other amphoteric elements or elements whose oxides upon hydrolysis form weak bases and which appear to form complexes with alcohols, ethers and esters. Among these condensing agents are included the following anhydrous metal and non-metal halides: titanium chloride, antimony chloride, and the chlorides, bromides, fluorides and iodides of the above metals including boron as well as such halides of aluminum, beryllium, titanium, zirconium, hafnium, thorium, columbium, sulfur, silicon, phosphorus, tantalum, chromium, vanadium and molybdenum. In addition, sulfuric acid, hydrochloric acid and phosphoric acid are suitable for the practice of this invention. Certain of the heteropolyacids, notably borophosphoric acid and borotungstic acid are also satisfactory. The preferred catalyst is boron trifluoride.

The carbon monoxide used may be commercial grade. To obtain products of the highest degree of purity it is preferable to remove from the commercial gases such objectionable constituents as sulfur compounds, metallic carbonyls, carbon dioxide, oxygen, etc.

The presence of inert gases in the carbon monoxide mixture is sometimes desirable. Nitrogen, for instance, aids in modifying the reaction rate. Other inert gases will usually act similarly to nitrogen.

Various proportions of starting materials can be employed depending upon the operating conditions chosen. Ordinarily a molal ratio of acid: catalyst:water of about 3:1:3 is employed, though other ratios can be used. In general, it is desirable to adjust the water/catalyst ratio to avoid that upper limit of water concentration which decreases catalyst activity. For instance in the case of boron fluoride, a water/$BF_3$ molal ratio of 5:1 may cause catalyst hydrolysis to boric acid with accompanying loss of activity.

The synthesis can be efficiently carried out under various operating conditions. The pressure should be superatmospheric, the upper limit being determined by the mechanical limitations of the equipment used. The preferable operating carbon monoxide pressure range is in the neighborhood of 400 to 1000 atmospheres. The temperature employed is usually dependent upon the type of pressure control desired in the particular reaction. That is, there appears to be a fairly definite and reproducible temperature range in which carbon monoxide absorption occurs. In most instances this temperature range will be encountered between 75° and 300° C., depending upon the proportions of reactants and catalyst employed, and the nature of the acid being processed. Ordinarily a reaction time of 1 to 4 hours is sufficient for substantially complete carbon monoxide absorption.

The apparatus which can be employed for conducting these reactions can be of any conventional type suitable for operation under superatmospheric pressures. Owing to the corrosive action of boron trifluoride the interior of the reaction vessel should preferably be protected in order to avoid inhibitory effects of certain materials of construction. This can be accomplished by using glass-lined apparatus, or by plating the inner surfaces thereof with chromium or silver or by using acid-resistant alloy steels containing, for example, high proportions of molybdenum, cobalt, tungsten, chromium, manganese, or nickel.

Purification of the resulting dibasic acids can be effected in various ways. The crude reaction mixture consisting of the dibasic acids can be converted to a readily distillable ester which is then purified by fractionation. The dibasic acid can also be separated by fractional precipitation or crystallization of the metallic salts or by crystallization of the free acids in those cases in which solid crystalline products are obtained. Selective oxidation of accompanying impurities may also aid in isolation of the desired products.

The dibasic acids and polybasic acids obtainable by practice of this invention are useful in the preparation of polymeric condensation products such as polyamides which are of value as coating compositions, textile fibers and the like, and also alkyd resins which are of special utility as protective coating compositions.

As many apparently widely different embodiments of this invention may be made without departing from the spirit and scope thereof, it is to be understood that this invention is not to be limited to the specific embodiments shown and described.

I claim:

1. A process for the production of higher molecular weight polycarboxylic acids which comprises bringing a carboxylic compound containing at least 8 carbon atoms selected from the group consisting of aliphatic mono-olefinic monocarboxylic acids, anhydrides and salts, and aliphatic hydroxy monocarboxylic acids into contact with carbon monoxide and water in the presence of a catalyst comprising a halide of an element selected from the group consisting of an amphoteric element and an element whose oxide upon hydrolysis forms weak bases and complexes with alcohols, ethers and esters, at temperatures between 75° C. and 300° C. and under a superatmospheric pressure.

2. A process for the production of higher molecular weight polycarboxylic acids which comprises bringing an aliphatic hydroxy monocarboxylic acid containing at least 8 carbon atoms into contact with carbon monoxide and water in the presence of a catalyst comprising a halide of an element selected from the group consisting of an amphoteric element and an element whose oxide upon hydrolysis forms weak bases and complexes with alcohols, ethers and esters, at temperatures between 75° C. and 300° C. and under a superatmospheric pressure.

3. The process in accordance with claim 1 characterized in that the catalyst is a boron halogen compound.

4. The process in accordance with claim 1 characterized in that the reaction is carried out at a temperature within the range of 100° to 250° C.

5. The process in accordance with claim 1 characterized in that the reaction is started under an initial carbon monoxide pressure of 400 to 1000 atmospheres.

6. A process for the production of a higher molecular weight dibasic acid which comprises bringing an aliphatic mono-olefinic monocarboxylic acid containing at least 8 carbon atoms, water, and carbon monoxide in contact with boron trifluoride at a temperature between 100° C. and 250° C. and under an initial carbon monoxide pressure of 400 to 1000 atmospheres.

7. A process for the production of higher molecular weight polycarboxylic acids which comprises bringing an aliphatic mono-olefinic monocarboxylic acid containing at least 8 carbon atoms into contact with carbon monoxide and water in the presence of boron fluoride at a temperature between 75° C. and 300° C. and under a superatmospheric pressure, said reaction being further characterized in that the molal ratio of acid:catalyst:water is about 3:1:3.

EDWARD C. KIRKPATRICK.